Oct. 29, 1929.  G. H. TANSLEY  1,733,563
MILK AND CREAM SEPARATOR
Filed May 5, 1928
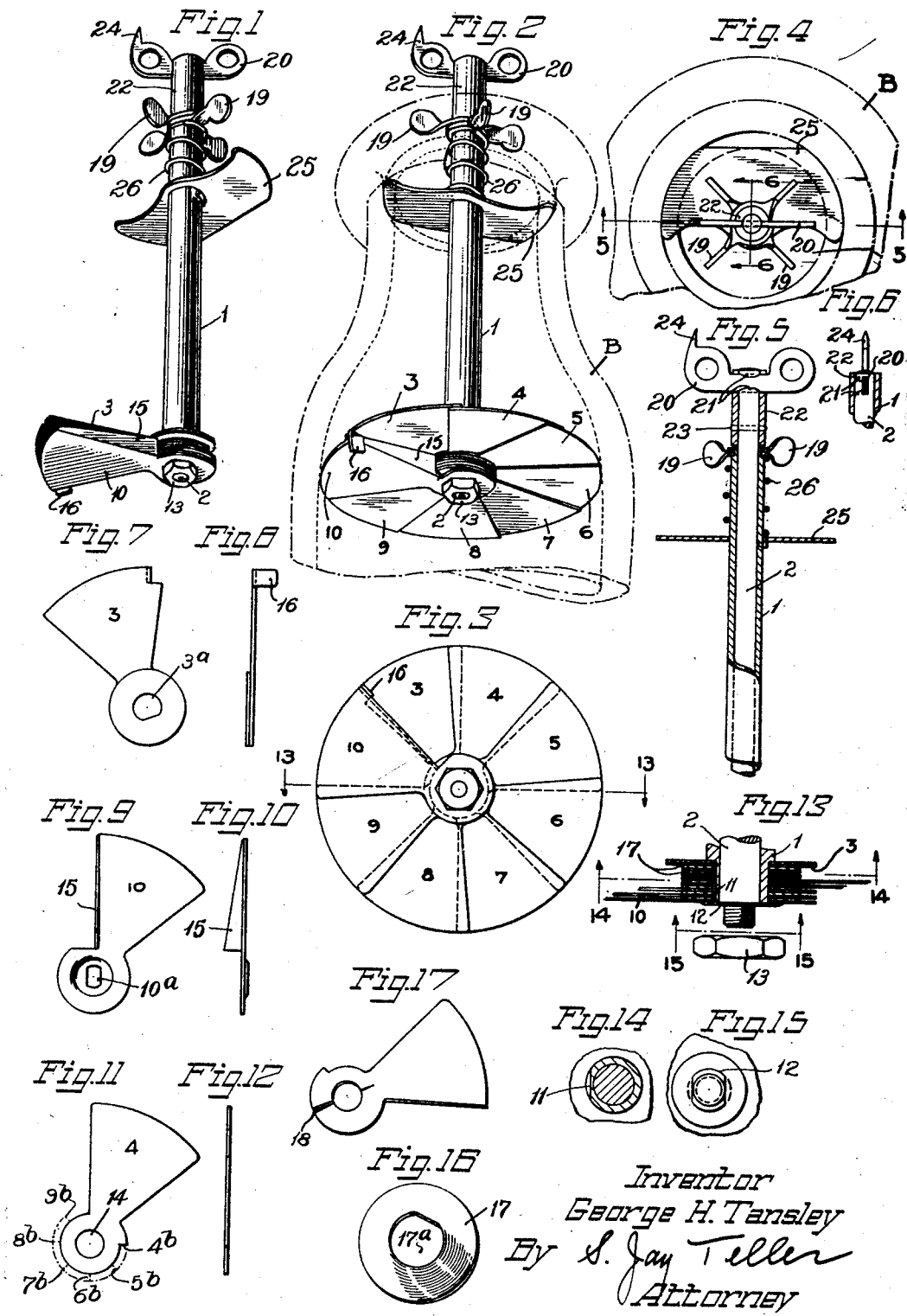
Inventor
George H. Tansley
By S. Jay Teller
Attorney Patented Oct. 29, 1929

1,733,563

UNITED STATES PATENT OFFICE

GEORGE H. TANSLEY, OF HARTFORD, CONNECTICUT

MILK AND CREAM SEPARATOR

Application filed May 5, 1928. Serial No. 275,464.

The general object of the invention is to provide a simple device which may be easily and conveniently inserted in the upper part of a milk bottle and which after insertion may be adjusted to form a horizontal partition separating the cream from the milk. The bottle may then be tilted to pour off the cream, the milk being retained in the bottle by the partition.

More specific objects of the invention are to provide certain improved details of construction whereby the foregoing general object is attained.

In the accompanying drawing I have shown the embodiment of the invention which I now deem preferable but it will be understood that the drawing is intended for illustrative purposes only and is not to be construed as defining or limiting the scope of the invention, the claims forming a part of this specification being relied upon for that purpose.

Of the drawings:

Fig. 1 is a perspective view of a device embodying the invention, this view showing the device in its closed position.

Fig. 2 is a view similar to Fig. 1 but showing the device in its open position and further showing the relationship between the device and a milk bottle.

Fig. 3 is a bottom view of the device as shown in Fig. 2.

Fig. 4 is a top view of the device as shown in Fig. 2.

Fig. 5 is a fragmentary vertical sectional view taken along the line 5—5 of Fig. 4.

Fig. 6 is a fragmentary vertical sectional view taken along the line 6—6 of Fig. 4.

Figs. 7 and 8 are plan and side views respectively of one partition element.

Figs. 9 and 10 are plan and side views respectively of another partition element.

Figs. 11 and 12 are plan and side views respectively of another partition element, this view also showing in dot-and-dash lines the outlines of still other partition elements.

Fig. 13 is an enlarged fragmentary sectional view taken along the line 13—13 of Fig. 3.

Fig. 14 is a fragmentary sectional view taken along the line 14—14 of Fig. 13.

Fig. 15 is a fragmentary bottom view taken along the line 15—15 of Fig. 13.

Fig. 16 is a perspective view of one of the friction washers.

Fig. 17 is a perspective view showing a partition element of alternative construction.

In accordance with the invention I provide a stem which is adapted to extend through the mouth of a milk bottle and I provide a plurality of partition elements connected with the stem and relatively movable either into closely grouped relationship which permits the device to be easily inserted into or removed from a milk bottle or into relatively extended positions in which they form a complete circular partition extending entirely across the milk bottle. Fig. 1 shows the device with the partition elements in closely grouped positions at one side and Fig. 2 shows the elements in their extended or partition forming positions and located in a bottle B.

The stem of the device preferably comprises two relatively movable parts 1 and 2, the part 1 being a tube or sleeve which surrounds the central rod 2 and is relatively rotatable thereon. I provide a plurality of relatively movable partition elements carried by the stem and eight such elements are shown numbered respectively 3 to 10. The partition elements 3 and 10 are secured respectively to the stem parts 1 and 2 and they are spaced apart to permit the other elements 4 to 9 to be located between them, the said other elements being relatively rotatable about the axis of the stem.

As shown in detail in Figs. 13 and 14 the lower end portion of the sleeve 1 is reduced in diameter and is flattened at one side as indicated at 11. The upper partition element 3 has the opening 3ª in the hub portion thereof provided with a flat surface at one side to engage the flattened portion 11 of the sleeve. Thus the element 3 is connected with the sleeve 1 for rotative movement therewith. The lower end of the rod 2 is provided with a projection 12 which is flattened at its sides as clearly shown in Fig. 15. The lower partition element 10 has the opening 10ª in the hub portion thereof shaped to fit the projection 12. A nut 13 engages the threaded lower end of the rod 2 to hold the partition element 10 in place. Thus the partition element 10 is secured to the rod 1 for rotation therewith. The remaining partition elements 4 to 9 are located between the said elements 3 and 10 and are pivotally mounted on the reduced lower portion of the sleeve 1. Each of these elements is provided with a circular hole 14 therein as shown in Fig. 11, the elements being thus free for rotative movement relatively to the sleeve.

Each of the partition elements 4 to 9 is provided with a shoulder on the hub portion thereof, the shoulders for the different elements being differently positioned as shown in Fig. 11. The positions of the several shoulders are indicated respectively by $4^b$, $5^b$, $6^b$, $7^b$, $8^b$ and $9^b$. One partition element is provided with means for successively engaging the several shoulders $9^b$, $8^b$, $7^b$, $6^b$, $5^b$, and $4^b$ when the said element is rotated. As shown the inner part of the flange 15 constitutes the said shoulder engaging means this being movable relatively to the element 3 in the clockwise direction from the position shown in Fig. 1. This relative rotation of the element 10 is effected by relatively rotating the stem parts 1 and 2 in the manner to be described, and the inner rod 2 may be regarded as being the movable part. As the result of the action of the flange 15 the several elements 9 to 4 are relatively rotated through different angles so as to occupy the relative positions shown in Figs. 2 and 3. The element 3 is provided with a finger 16 which serves as a stop to limit the angular movement of the element 10. The elements 3 to 10 form a complete circular partition as shown in Figs. 2 and 3, and the flange 15 on the element 10 serves to close the space between the two elements 10 and 3 as clearly shown.

After the parts have been moved to the positions shown in Figs. 2 and 3 they may be returned to the positions shown in Fig. 1 by reversing the relative rotative movement of the stem elements 1 and 2. In order that this may be done one of the said elements 3 or 10 is provided with means for successively engaging the several partition elements to relatively move them. As illustrated the said means is the finger 16 already referred to, but as to this I do not necessarily limit myself. If the outer stem part 1 be regarded as being the movable element, it will be seen that the partition element 3 is rotated in the clockwise direction from the position shown in Fig. 2, the depending finger 16 engaging successively with the partition elements 4, 5, 6, 7, 8 and 9 and moving them to superposed or grouped positions as shown in Fig. 1. When the finger 16 engages with the bottom partition element 10 rotative movement is stopped.

I preferably provide means for frictionally resisting the relative rotative movement of the several partition elements this friction means serving under normal conditions to prevent any relative movement of the said elements except as positively caused by the engagement therewith of the flange 15 or the finger 16. The details of the means for providing the frictional resistance may be varied but as shown in Figs. 13 and 16 I may attain the desired frictional resistance by placing between each two partition elements a thin sheet metal washer such as the washer 17 shown in Figs. 14 and 16. The opening $17^a$ in this washer is flattened at one side to fit the flattened portion 11 of the sleeve 1 and the washer is initially slightly cupped or dished so as to be placed under a slight tension when the parts are forced into their proper positions by means of the nut 13. It will be obvious that the dished washers 17 bearing against the adjacent partition elements will provide friction tending to resist the movement of one element relatively to another. The elements will therefore be moved only so far as required by the relative movements of the flange 15 and the finger 16.

As an alternative to the use of the washers as shown in Fig. 16 I may split the hub portions of the partition elements as shown at 18 in Fig. 17. With the friction elements split and slightly bent as shown they will engage directly with each other to provide the required friction.

Suitable manually operable means are provided on the stem parts 1 and 2 near the upper ends thereof for effecting relative rotative movement. As shown the sleeve 1 has secured thereto sheet metal finger pieces 19, 19 and the inner rod 2 has secured thereto a finger piece 20. The finger piece 20 is shown as extending through a notch in the rod 2, the edges of the notch being peened over as shown at 21 in Fig. 6 to hold the finger piece in place. Preferably in order to provide an improved appearance the upper end of the rod 2 is surrounded by a sleeve 22 which is notched to receive the finger piece 21 and which is held in place by a pin 23. The finger piece 20 may, if desired, be provided with a point 24 adapted to be used for removing the paper caps from the milk bottles.

It will be obvious that by manually holding the finger pieces 19 and 20 and by turning one of the stem parts relatively to the other the partition parts may be moved as already described either into the open position as shown in Fig. 2 or in the closed position shown in Fig. 1.

Preferably in order to effectively hold the device in place in the milk bottle I provide a plate 25 having a hole therein through which the sleeve 1 of the stem extends. The plate 25 is slidable on the sleeve and is engaged by a coil spring 26 which surrounds the sleeve and which abuts at its upper end against the lower finger piece 19. The lower end of the spring extends through the plate 25 to limit the downward movement thereof.

In use the device, with the partition parts in the positions shown in Fig. 1, is inserted into the milk bottle. The plate 25 enters the mouth of the bottle as clearly shown in Figs. 2 and 4, fitting the shoulder which ordinarily supports the bottle cap. The stem and the partition parts carried thereby are manually forced downward in opposition to the spring 26 so as to leave the partition parts relatively free while they are being moved to their open position as already described. As soon as the partition parts are in their open position, the stem and partition parts are permitted to be forced upward or outward by the spring 26 to the position shown in Fig. 2 with the partition firmly engaging the wall of the bottle. The partition in this position serves to retain the milk in the lower portion of the bottle. By tilting the bottle the cream in the upper portion can be poured out through the opening provided at one side of the plate 25.

It will be understood that devices embodying the invention may be made in different sizes to fit different sizes of bottles.

What I claim is:

1. In a device of the character described, the combination of a stem adapted to extend through the mouth of a bottle and comprising two relatively rotatable parts, two partition elements respectively secured to the said stem parts near the lower ends thereof, other partition elements relatively movable about the axis of the stem, and means on one of the first said elements for successively engaging the last said elements to rotatively move them to form a partition entirely surrounding the stem.

2. In a device of the character described, the combination of a stem adapted to extend through the mouth of a bottle and comprising two relatively rotatable parts, two partition elements respectively secured to the said stem parts near the lower ends thereof, other partition elements relatively movable about the axis of the stem and provided with differently positioned shoulders, and means on one of the first said elements for successively engaging the shoulders of the last said elements to rotatively move them to form a partition entirely surrounding the stem.

3. In a device of the character described, the combination of a stem adapted to extend through the mouth of a bottle and comprising two relatively rotatable parts, two partition elements respectively secured to the said stem parts near the lower ends thereof, other partition elements relatively movable about the axis of the stem, means on one of the first said elements for successively engaging the last said elements to rotatively move them to form a partition entirely surrounding the stem, and means on one of the first said elements for successively engaging the last said elements to rotatively move them to locations entirely at one side of the stem.

4. In a device of the character described, the combination of a stem adapted to extend through the mouth of a bottle and comprising two relatively rotatable parts, two partition elements respectively secured to the said stem parts near the lower ends thereof, other partition elements relatively movable about the axis of the stem, and two projecting means carried respectively by the two first said elements, one serving to successively engage the last said elements to rotatively move them to form a partition entirely surrounding the stem and the other serving to successively engage the last said elements to rotatively move them to locations entirely at one side of the stem.

5. In a device of the character described, the combination of a stem adapted to extend through the mouth of a bottle and comprising two relatively rotatable parts, two partition elements respectively secured to the said stem parts near the lower ends thereof, other partition elements relatively movable about the axis of the stem and provided with differently positioned shoulders, means on one of the first said elements for successively engaging the shoulders of the last said elements to rotatively move them to form a partition entirely surrounding the stem, and means on one of the first said elements for successively engaging the last said elements to rotatively move them to locations entirely at one side of the stem.

6. In a device of the character described, the combination of a stem adapted to extend through the mouth of a bottle and comprising two relatively rotatable parts, two sheet metal partition elements spaced apart and respectively secured to the said stem parts near the lower ends thereof, other sheet metal partition elements located between the first said elements and relatively movable about the axis of the stem, means on one of the first said elements for successively engaging the last said elements to rotatively move them to form a partition entirely surrounding the stem, means on one of the first said elements for successively engaging the last said elements to rotatively move them to locations entirely at one side of the stem, and friction means located at the hub portions of the elements to resist relative movement between them.

7. A device of the character described in claim 6 wherein the said friction means comprises spring washers located between the hub portions of adjacent partition elements.

8. In a device of the character described, the combination of a stem adapted to extend through the mouth of a bottle and comprising two relatively rotatable parts, two sheet metal partition elements spaced apart and respectively secured to the said stem parts near the lower ends thereof, other sheet metal partition elements located between the first said elements and relatively movable about the axis of the stem, means on one of the first said elements for successively engaging the last said elements to rotatively move them to form a partition entirely surrounding the stem, means on one of the first said elements for successively engaging the last said elements to rotatively move them to locations entirely at one side of the stem, and a flange at the edge of one of the first said elements for closing the space between the two first said elements.

9. In a device of the character described, the combination of a stem adapted to extend through the mouth of a bottle and comprising two relatively movable parts, partition forming means carried by the stem near the lower end thereof and movable by relative movement of the said stem parts either to positions forming a complete circular partition or to positions within a segment of less than 180°, a retaining plate movably connected with the stem and adapted to engage the mouth of the bottle, and a spring tending to move the stem and partition means outward relatively to the plate.

10. A device of the character described in claim 9 wherein the lower inner end of the said spring is connected with the retaining plate to limit movement thereof toward the said partition elements.

11. A device of the character described in claim 9 wherein the said retaining plate is of such size and shape as to be adapted to enter the mouth of the bottle and engage the shoulder thereof ordinarily engaged by the bottle cap.

In testimony whereof I have hereunto set my hand this 4th day of May, 1928.

GEORGE H. TANSLEY.